April 23, 1968     K. ENKE     3,379,268

WHEEL SUSPENSION

Filed Oct. 19, 1965

INVENTOR
KURT ENKE

BY *Dicke & Craig*

ATTORNEYS

United States Patent Office 3,379,268
Patented Apr. 23, 1968

3,379,268
WHEEL SUSPENSION
Kurt Enke, Fellbach, Wurttemberg, Germany, assignor to Daimler-Benz Aktiengesellschaft, Stuttgart, Germany
Filed Oct. 19, 1965, Ser. No. 497,860
Claims priority, application Germany, Oct. 27, 1964, D 45,718
14 Claims. (Cl. 180—73)

ABSTRACT OF THE DISCLOSURE

A wheel suspension for motor vehicles, particularly the driven rear wheels thereof, wherein the axle gear is pivoted about a transverse axis forwardly of the rear wheel centers and has a forwardly extending lever arm connected to arm portions of the inclined guide members extending forwardly of the guide member pivots.

Background of the invention

With the soft springing of the vehicle wheels generally aimed at in today's construction, for example, with the use of hydropneumatic springs, the pitching or dipping of the vehicle is noticeable in an unpleasant manner which occurs in the vehicle rear part during the starting and the sudden accelerations by reason of the inertia of the mass acting through the center of gravity of the vehicle.

Summary of the invention

The purpose of the present invention above all is to provide an arrangement which is to counteract this pitching or dipping of the vehicle rear part. Accordingly, the present invention essentially consists in that the axle gear housing is pivotally suspended about a vehicle cross axis and is so supported by means of a lever arm at the vehicle wheel suspension elements partaking in the wheel spring movements that the pitching or dipping tendency of the vehicle during starting or acceleration is counteracted by the transmission to the wheel suspension elements of the reaction moment acting at the axle gear housing.

The support of the axle gear housing takes place advantageously by the wheel guide members, especially by means of inclined guide arms. However, possibly also parts of the wheel spring systeme or other elements, which participate in the spring movements of the wheels, may be used for purposes of the present invention.

In one preferred embodiment of the persent invention, with guide members supported at the vehicle superstructure in front of the wheels, the arm serving for the support of the axle gear housing is directed forwardly whereby this forwardly directed arm is supported on the arms of the longitudinal or inclined guide members which are extended in the forward direction beyond the bearing axis of the guide members in front of the wheel centers. The cross axis, about which the axle gear housing is pivotally supported, is thereby located preferably in front of the wheel centers. In order to satisfy the different types of movements of the wheels in the spring direction, the axle gear housing is additionally supported on the guide members supporting the wheels by means of an equalization means, for example, by means of a transversely disposed scale beam or rocker arm.

Accordingly, it is an object of the present invention to provide a wheel suspension which effectively counteracts the pitching or dipping movements of the vehicle occurring during starting or sudden accelerations, yet is simple in construction, easy to assemble, and relatively inexpensive.

Another object of the present invention resides in a wheel suspension, especially for the rear wheels of motor vehicles, which can be used to great advantage with a relatively soft spring system of the wheels and which eliminates any unpleasant sensations on the part of the driver or passengers as a result of the pitching or dipping movements of the rear part of the vehicle during sudden accelerations.

A further object of the present invention resides in the provision of a rear wheel suspension system for motor vehicles which is extremely simple in construction and operationally reliable to counteract those forces which normally seek to depress the rear end of the vehicle during sudden accelerations.

Brief description of the drawing

These and further objects, features, and advantages of the present invention will become more obvious from the following description when taken in connection with the accompanying drawing which shows, for purposes of illustration only, one embodiment in accordance with the present invention, and wherein.

Detailed description of the drawing

Figure 1:
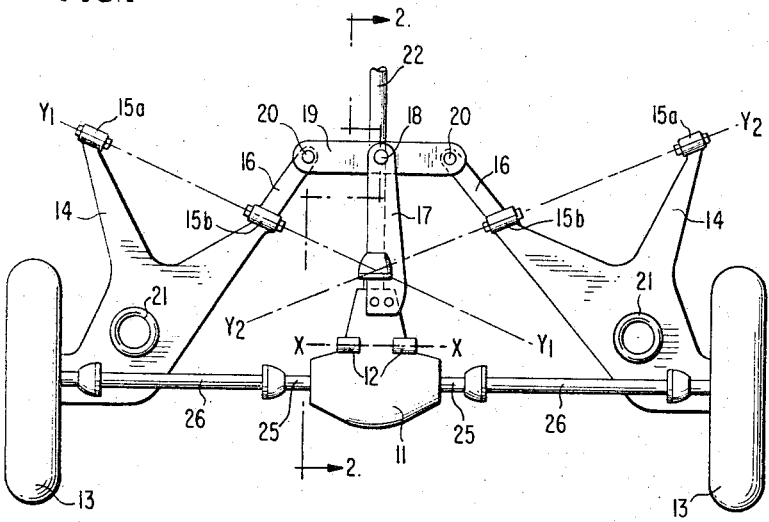
FIGURE 1 is a plan view on a wheel suspension in accordance with the present invention.

Referring now to the drawing wherein like reference numerals are used throughout the two views to designate like parts, reference numeral 10 designates therein a frame member or any other part of the vehicle superstructure, such as a structural member of a self-supporting type vehicle body. The housing 11 of the rear axle gear is pivotally suspended at the superstructure 10 in two support bearings 12 about a cross axis $x$—$x$, for example, by the interposition of conventional rubber bushings or similar elastic elements. Similarly, the inclined guide members 14, which support the rear wheels 13 of the motor vehicle, pivot about axes $y_1$—$y_1$ and $y_2$—$y_2$ which are inclined to the driving direction of the vehicle owing to the fact that the inclined guide members 14—preferably by the interposition of rubber bushings or the like—are each pivotally supported at the vehicle superstructure in two bearings 15a and 15b of any conventional construction. Each of the two inclined guide members 14 is thereby of fork-like construction whereby one fork arm carries the bearing eye of the bearing 15a nearer the vehicle wheel and the other fork arm carries the bearing eye of the bearing 15b more remote from the vehicle wheel. The last-mentioned bearing arm is in each case provided with an extension 16 extending beyond the respective bearing 15b.

The axle gear housing 11 is provided with a forwardly directed arm 17, for example, bolted thereto which is supported—preferably also by interposition of appropriate rubber elements or the like—by means of a joint 18 on a scale beam or rocker arm 19 which, in its turn, is supported for universal movement in joints 20, preferably rubber joints or by other suitable universal joint means on the extensions 16 of the inclined guide arms 14.

The inclined guide members 14 are spring-supported against the vehicle superstructure by springs 21, for example, by hydropneumatic springs. The drive of the wheels 13 takes place, for example, from a forwardly arranged engine (not shown) by way of a Cardan shaft 22 which, for example, by means of a bevel pinion 23 and axle drive bevel gear 24, drives the lateral axle shaft 25, which in turn are in driving connection by means of double joint shaft 26 with the wheels 13 supported on the inclined guide members 14.

Figure 2:
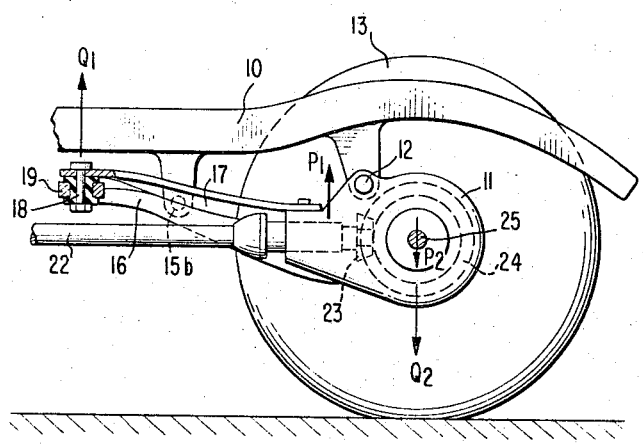
FIGURE 2 is a cross sectional view, on an enlarged scale, taken along line 2—2 of FIGURE 1.

During starting of the vehicle or during sudden accelerations thereof, forces $P_1$, $P_2$ occur in the bearings of the transmission members of the axle gear which produce a torque in the clockwise direction as viewed in FIGURE 2. The axle gear housing 11 thereby seeks to rotate in bearings 12 about the cross axis $x$—$x$ whereby a force $Q_1$ occurs in the joint 18 that seeks to press the scale beam or rocker arm 19 and thereby the extensions 16 of the inclined guide members 14 in the upward direction and therewith seeks to press the wheels 13 downwardly with a force $Q_2$ relative to the vehicle superstructure. The so-called starting dip or pitching motion occurring during starting or sudden accelerations can be counteracted thereby. Depending on the design and layout of the lever arms, this starting pitch or dipping motion can be suitably equalized or compensated for to a greater or lesser degree.

While I have shown and described one embodiment in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. A wheel suspension for motor vehicles, especially for the rear wheels of motor vehicles, having a vehicle superstructure and an axle gear housing suspended at the vehicle superstructure, comprising:
   means for pivotally suspending said axle gear housing at said vehicle superstructure about a cross axis,
   wheels suspension means including guide means for suspending the vehicle wheels at said vehicle superstructure
   about a bearing axis and said guide means having arm portions extending in the forward direction beyond the bearing axis in front of the wheel centers, connecting means including lever arm means forwardly drivingly connected to said arm portions for supporting said axle gear housing on said guide means in such a manner as to produce a counter force counteracting the pitching movements of the vehicle during starting and accelerations thereof by the transmission of the reaction moment acting on the axle gear housing,
   said guide means being supported at said vehicle superstructure in front of the wheels.

2. A wheel suspension according to claim 1, wherein said cross axis is located in front of the wheel centers.

3. A wheel suspension according to claim 1, wherein said lever arm means includes equalization means having a substantially transversely disposed rocker arm for supporting said axle gear housing on said guide means.

4. A wheel suspension according to claim 3, wherein said guide means are of fork-like construction having one arm nearer the wheel and one arm directed toward the vehicle longitudinal center plane.

5. A wheel suspension according to claim 1, wherein said lever arm means includes equalization means having a substatnially transversely disposed rocker arm for supporting said axle gear housing on said guide means, and means operatively connecting said rocker arm with said axle gear housing and said guide means including elastic joint means enabling universal movements.

6. A wheel suspension according to claim 5, wherein said guide means are of fork-like construction having one arm nearer the wheel and one arm directed toward the vehicle longitudinal center plane.

7. A wheel suspension according to claim 1, wherein said cross axis is located in front of the wheel centers, said lever arm means includes a forwardly extending arm on said axle gear housing and equalization means including a transversely disposed rocker arm connected on said arm portions and said forwardly extending arm for supporting said axle gear housing on said guide means, and said lever arm means including elastic joint means enabling universal movements between said guide means and said axle gear housing.

8. A wheel suspension according to claim 7, wherein each of said guide means is of fork-like construction having one arm nearer the wheel and the other arm directed toward the vehicle longitudinal center plane, said other arm including the respective extended portion.

9. A wheel suspension for motor vehicles, especially for the rear wheels of motor vehicles, having a vehicle superstructure and an axle gear housing suspended at the vehicle superstructure, comprising: means for pivotally suspending said axle gear housing at said vehicle superstructure about a cross axis, wheel suspension means including guide means for suspending the vehicle wheels about a bearing axis at said vehicle superstructure, connecting means including lever arm means and operatively connecting said axle gear housing with elements of the wheel suspension means partaking in the spring movements thereof in such a manner that the pitching tendency of the vehicle during starting and acceleration thereof is counteracted by the transmission of the reaction moment acting on the axle gear housing, said guide means being extended in the forward direction beyond their bearing axis, said connecting means including a generally forwardly directed arm supported on the extended portions of said guide means.

10. A wheel suspension according to claim 9, wherein each of said guide means is of fork-like construction having one arm nearer the wheel and the other arm directed toward the vehicle longitudinal center plane, said other arm including the respective extended portion.

11. A wheel suspension according to claim 9, wherein said lever arm means include equalization means operatively connected between said forwardly directed arm and said extended portions, said cross axis being horizontally located between said equalization means and the center line of the rear wheels.

12. A wheel suspension according to claim 11, wherein said last-mentioned connecting means includes elastic joint means enabling universal movements.

13. A wheel suspension according to claim 9, wherein said cross axis is located in front of the wheel centers.

14. A wheel suspension according to claim 13, wherein said last-mentioned connecting means includes elastic joint means enabling universal movements.

References Cited

UNITED STATES PATENTS 3,245,490   4/1966   Muller _____ 180—73

A. HARRY LEVY, *Primary Examiner.*